(12) United States Patent
O'Brien

(10) Patent No.: US 12,554,063 B2
(45) Date of Patent: Feb. 17, 2026

(54) DEVICES AND METHODS FOR WAVEGUIDE ALIGNMENT

(71) Applicant: University College Cork—National University of Ireland, Cork, Cork (IE)

(72) Inventor: Peter O'Brien, Cork (IE)

(73) Assignee: UNIVERSITY COLLEGE CORK—NATIONAL UNIVERSITY OF IRELAND, CORK, Cork (IE)

( * ) Notice: Subject to any disclaimer, the term of this patent is extended or adjusted under 35 U.S.C. 154(b) by 132 days.

(21) Appl. No.: 17/800,416

(22) PCT Filed: Feb. 19, 2021

(86) PCT No.: PCT/EP2021/054155
§ 371 (c)(1),
(2) Date: Aug. 17, 2022

(87) PCT Pub. No.: WO2021/165470
PCT Pub. Date: Aug. 26, 2021

(65) Prior Publication Data
US 2023/0081917 A1 Mar. 16, 2023

Related U.S. Application Data

(60) Provisional application No. 62/978,442, filed on Feb. 19, 2020.

(30) Foreign Application Priority Data

Feb. 19, 2020 (GB) ........................... 2002284

(51) Int. Cl.
*G02B 6/12* (2006.01)
*G02B 6/124* (2006.01)

(52) U.S. Cl.
CPC .... *G02B 6/124* (2013.01); *G02B 2006/12107* (2013.01)

(58) Field of Classification Search
None
See application file for complete search history.

(56) References Cited

U.S. PATENT DOCUMENTS 8,267,583 B2 * 9/2012 Yao .................. G02B 6/12002
384/31
8,447,150 B2 * 5/2013 Kopp ...................... G02B 6/30
385/37

(Continued)

FOREIGN PATENT DOCUMENTS

JP 5134028 B2 1/2013

OTHER PUBLICATIONS

International Search Report and Written Opinion for PCT/EP2021/054155, mailed May 21, 2021 (15 pages).

*Primary Examiner* — Rhonda S Peace
(74) *Attorney, Agent, or Firm* — Quarles & Brady LLP

(57) ABSTRACT

The present disclosure is directed towards aligning a photonic integrated circuit (PIC) through providing a PIC with a marker waveguide, wherein a marker waveguide is a waveguide having: a first end located at the edge of the PIC wherein the first end is coupled to an edge coupling; and a second end coupled to a grating coupler or a device coupler, wherein: the grating coupler or device coupler is configured to receive light and couple the light to the waveguide to illuminate the waveguide to facilitate the correct alignment of the edge coupler to an external component.

14 Claims, 5 Drawing Sheets

(56) References Cited

U.S. PATENT DOCUMENTS

| | | | | |
|---|---|---|---|---|
| 9,028,157 B2* | 5/2015 | Na | ............... | G02B 6/12 |
| | | | | 385/37 |
| 9,316,800 B1* | 4/2016 | Celo | ............... | G02B 6/4249 |
| 9,335,480 B1 | 5/2016 | Celo | | |
| 9,494,748 B2* | 11/2016 | Chen | ............... | G02B 6/4227 |
| 9,613,886 B2* | 4/2017 | Lin | ............... | G02B 6/12 |
| 10,042,131 B1 | 8/2018 | Lesea | | |
| 10,088,299 B2* | 10/2018 | Tokushima | ............... | G02B 6/34 |
| 10,613,281 B2* | 4/2020 | Mekis | ............... | G02B 6/4208 |
| 11,022,755 B2* | 6/2021 | Chen | ............... | G02B 6/3882 |
| 11,460,651 B2* | 10/2022 | Islam | ............... | H10H 20/855 |
| 11,971,591 B2* | 4/2024 | Menezo | ............... | G02B 6/4207 |
| 12,038,608 B2* | 7/2024 | Bandyopadhyay | ............... | G02B 6/125 |
| 12,130,470 B2* | 10/2024 | Polomoff | ............... | G02B 6/30 |
| 2013/0308898 A1* | 11/2013 | Doerr | ............... | G02B 6/12 |
| | | | | 385/14 |
| 2015/0215046 A1* | 7/2015 | Mekis | ............... | G02B 6/4213 |
| | | | | 385/14 |
| 2016/0202432 A1 | 7/2016 | Chen et al. | | |
| 2016/0334590 A1 | 11/2016 | Celo et al. | | |
| 2017/0195064 A1* | 7/2017 | Chang | ............... | H04B 10/801 |
| 2018/0313718 A1* | 11/2018 | Traverso | ............... | G02B 6/1228 |
| 2023/0081917 A1* | 3/2023 | O'Brien | ............... | G02B 6/12004 |
| | | | | 385/14 |

* cited by examiner

DEVICES AND METHODS FOR WAVEGUIDE ALIGNMENT

This application is a U.S. National Stage application, filed pursuant to 35 U.S.C. § 371, of international application no. PCT/EP2021/054155, filed on Feb. 19, 2021, which claims the benefit of Great Britain Patent Application No. 2002284.4, filed Feb. 19, 2020, and U.S. Provisional Patent Application No. 62/978,442, filed Feb. 19, 2020, the contents of which is incorporated herein by reference in its entirety.

FIELD

The present disclosure is directed towards improvements in the packaging of photonic integrated circuits (PICs). PICs are also known in the art as integrated optical circuits and integrated photonic circuits.

BACKGROUND

A PIC is a device that integrates a plurality of photonic functions and typically provides functions for information signals imposed on light. As used herein, 'light' refers to electromagnetic wavelengths preferably in the visible spectrum, UV spectrum, or near infrared spectrum. At present, the typical wavelength of light used is in the region of 850 nm-1650 nm. The primary application for PICs is in the area of fibre-optic communication though applications in other fields such as biomedical and photonic computing are also possible.

In use, a waveguide of a PIC is coupled to an optical component such as optical fibre or a micro optic element in order receive and/or transmit light. PICs (for example silicon PICs) can be designed using a number of optical input and output coupling techniques. These include surface 'grating' and facet 'edge' couplers.

There are two kinds of coupling mechanism used in photonics: i) in-line coupling, where light is coupled in line with a waveguide (i.e. the angle between the light incident on the coupler and the wave guide is 180°) and ii) vertical coupling, where the light incident on the coupler is not aligned at 180° to the waveguide and is preferably aligned at 90° to the waveguide. An edge couple is used for in-line coupling, where grating coupler is a commonly used component for vertical coupling. Both coupling designs are commonly used to connect the photonic device with optical components such as optical fibres or micro optic elements.

Grating couplers are an attractive coupling technique because they can be implemented at wafer-level, where the grating structures are lithographically defined on the surface of the photonic device. However, grating couplers have limitations, such as limiting the spectral bandwidth and polarisation of the input and output coupled light. This can restrict their application, especially applications where coupling of a wide spectral bandwidth is required, such as wavelength division multiplexing for optical communications or spectral analysis for diagnostic and sensing applications.

Edge couplers are known to overcome these limitations. Edge couplers offer a relatively wide bandwidth of performance and a significantly lower polarisation dependence compared to grating couplers.

State-of-the-art edge couplers typically include mode adaptors with a mode field diameter (MDF) in the range of 3-10 microns at 1550 nm. The mode adaptors are used to interface between the sub-micron silicon waveguide and external single mode optical fibre or micro lens. As a result of their desirable performance specifications, edge couplers are becoming the preferred choice to interface with external optical components.

However, the uptake of edge couplers has been hindered by difficulties in packaging and aligning edge coupled PICs. Optical packaging of edge coupled PICs, such as when connecting a PIC to optical fibre(s) or micro optic element(s), requires the ability to image each individual waveguides of the PIC to enable precision alignment of the waveguide with respect to the external optical fibre or micro optic element. If these elements are not aligned with sufficient precision the resulting system does not work. This packaging process is especially challenging for arrays of waveguides, which typically require six degrees of freedom for the alignment process (three spatial and three angular axes). In the optical packaging process, the PIC waveguides must be visible to enable sufficiently accurate alignment.

Techniques to view the PIC waveguides include imaging of the physical waveguide structures. However, this can be challenging due to their small size. A further challenge if that the waveguides of the PIC can be located in the packaging such that they are packaged out-of-view (i.e. remote from the line of sight) of an external imaging system.

Alternatively, the device can be provided with a light source to illuminate the waveguides. For example, the waveguides can be illuminated using a Laser or Super Luminescent Diode. This process is known as active alignment. However, PICs (and in particular silicon PICs) do not typically comprise such a light source. Furthermore, including an optical light source for the sake of illumination increases the cost of the PIC. As a result, active alignment has not yet become a practical method for illuminating waveguides.

A further problem is that PICs are often flipchip mounted. This is a form of surface mounting where the PIC is mounted on another element such that the substrate of the PIC faces away from the other element (i.e. the PICs are mounted up-side-down). This results in the waveguides and electrical bond pads of PICs being located in close proximity to the electrical carrier substrate (electrical interposer). This bonding arrangement is typically required to facilitate high-speed electrical connections, avoiding the need for wire bonds between the photonic device and electrical interposer.

A flipchip mounting of a PIC 2 on an electrical interposer 4 is shown in FIG. 1. In this arrangement, the edge coupling of optical waveguide 1 of the PIC 2 is difficult or impossible to view as it is hidden by the substrate of the PIC. As a result, it is difficult to correctly align waveguide 1 of the PIC 2 to an external optical coupling component. Thus, in the example shown in FIG. 1 it is not possible to align the PIC with the electrical interposer 4 to correctly receive an optical output 3 from the PIC.

U.S. Pat. No. 10,042,131, assigned to Xilinx Inc, discloses a technique for testing or aligning optical components in a photonic chip. US patent publication number US2018/313718 discloses a technique for testing optical components in a photonic chip using a testing structure. Neither of these US patent publications solves the problems of optical packaging in PIC devices.

The present disclosure is directed towards overcoming the problems with the prior art set out above and towards providing and improved PIC and alignment method to facilitate the alignment of PICs with e.g. optical fibre(s) or micro optic element(s).

SUMMARY

The present disclosure is directed towards PICs, devices comprising PICs and methods for packaging PICs, the features of which are set out in the appended claims.

In particular, the present invention is directed towards a photonic integrated circuit (PIC) comprising a marker waveguide. A marker waveguide is a waveguide having: a first end located at the edge of the PIC wherein the first end is coupled to an edge coupling; and a second end coupled to a grating coupler or a device coupler, wherein the grating coupler or device coupler is configured to receive light and couple the light to the waveguide to illuminate the waveguide to facilitate the correct alignment of the edge coupler to an external component.

In the context of the present invention the use of the term 'grating coupler' should be interpreted broadly and used to mean any 'surface scattering structures' as well as grating couplers. All that is required to enable the invention is a device or structure to scatter low power light into the waveguide so a packaging camera can see the outer waveguides and achieve 'first-light'. These surface scattering structures can be gratings, mirrors or simple etched cavities in the photonic device. This enables the invention to apply to a wider range of photonic devices, for example silicon, InP and SiN.

Preferably, the PIC comprises two or more marker waveguides and an array of other edge coupled waveguides. More preferably, at least two of the marker waveguides are provided one at each outer position of the waveguide array.

The marker waveguides can optionally positioned at a fixed pitch. Optionally, the fixed pitch matches the pitch of the other edge coupled waveguides.

The present invention is also directed towards a device comprising the PIC of any preceding claim. The device can optionally comprise a glass or silicon interposer on which the PIC is flipchip mounted. The device can also optionally include an integrated micro turning mirror and silicon or glass package capping layer, through which input and output light can be transmitted.

The present invention is also directed towards a method of aligning a photonic integrated circuit (PIC) with an external optical element comprising: providing the PIC with a marker waveguide, illuminating the grating coupler of the marker waveguide with a light source to illuminate the marker waveguide; and aligning the PIC using the light emitted by the edge coupler of the marker waveguide.

Preferably, the PIC is provided with two marker waveguides.

Optionally, the method comprises flipchip mounting the PIC on a glass or silicon interposer.

Optionally the light illuminating the grating coupler of the marker waveguide is directed to the grating coupler of the marker waveguide from: above the PIC surface; or below the PIC surface, through the substrate of a device comprising the PIC.

In one embodiment, the light source is comprised within the packaging equipment for packaging the PIC to facilitate the active alignment of the PIC.

Preferably, the PIC is provided with at least two marker waveguides; and the marker waveguides are provided at each outer position of an array of other edge coupled waveguides. Optionally, the marker waveguides are positioned as outer waveguides with a fixed pitch, wherein the fixed pitch matches the pitch of the other waveguides in the array of waveguides.

Optionally micro lenses are actively aligned to the edge of photonic device using packaging equipment including a tuning mirror or periscope and imaging camera.

Optionally the light for illuminating the grating coupler of the marker waveguide is provided through a glass or silicon interposer on which the PIC is flipchip mounted.

In one embodiment there is provided photonic integrated circuit (PIC) comprising a marker waveguide, wherein the marker waveguide comprises:
  a first end located at the edge of the PIC wherein the first end is coupled to an edge coupling; and
  a second end coupled to a device coupler, wherein:
  the device coupler is configured to receive light and couple the light to the waveguide to illuminate the waveguide to facilitate the correct alignment of the edge coupler to an external component.

Preferably, one or more 'alignment wave guides' which are optical waveguides located outside a set of waveguides, with the functional or usable waveguides positioned in-between these two outer alignment waveguides to enable angular alignment.

BRIEF DESCRIPTION OF THE DRAWINGS

The invention will be more clearly understood from the following description of an embodiment thereof, given by way of example only, with reference to the accompanying drawings, in which:—

DETAILED DESCRIPTION OF THE DRAWINGS

The present disclosure provides a novel means of illuminating optical waveguides to enable precise active alignment of edge coupled waveguide to external optical components such as optical fibres or micro optic elements. The technique involves incorporating connected optical elements in the photonic device design.

Figure 1:
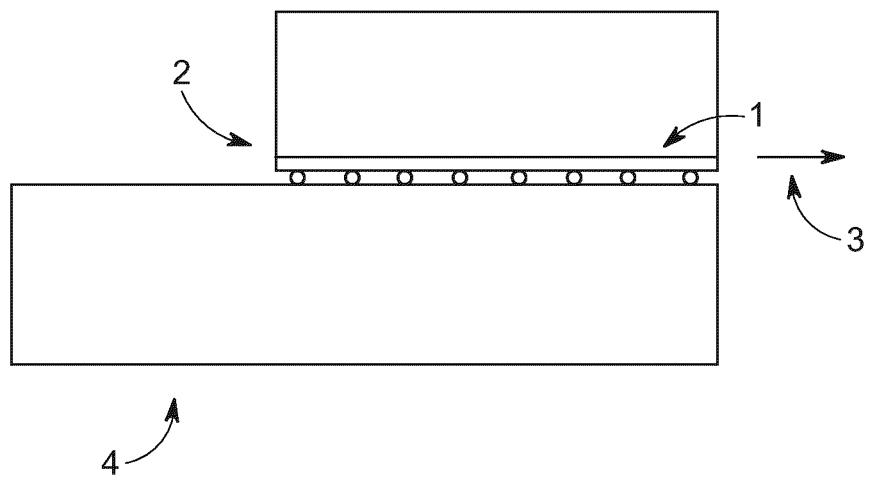
FIG. 1 is side view of a PIC, flipchip mounted on an electrical interposer.
Figure 2:
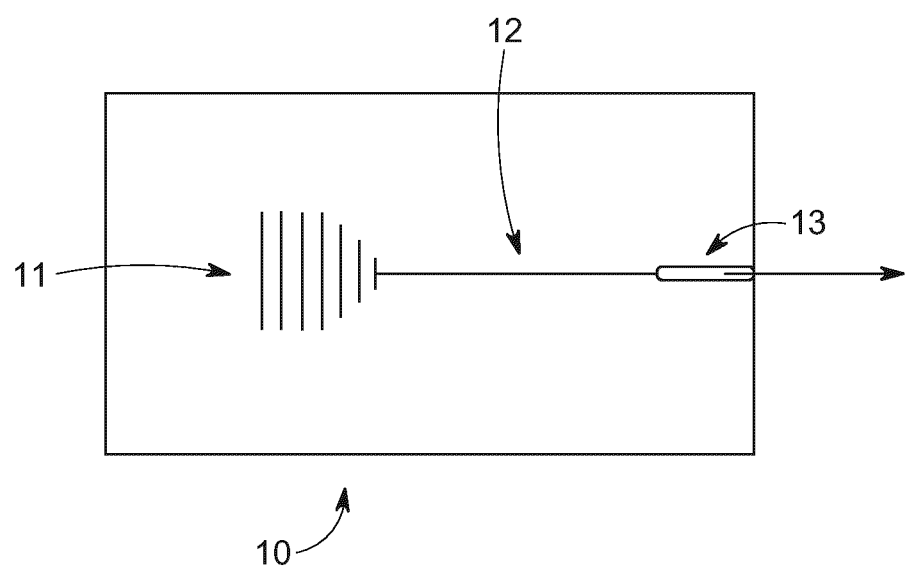
FIG. 2 is a top view of an alignment element.

FIG. 2 illustrates an exemplary optical element 10. The optical element comprises a grating coupler 11 connected to a waveguide 12. A 'grating coupler' is a region on top of or below a waveguide where there is a grating. Off-resonance light incident on the grating behaves almost the same as it would if it was incident in an area where there is no grating. For specific combinations of incident angles and light frequency, there is resonance, allowing the grating to couple light into a guided mode of the waveguide. Thus, the grating coupler 11 is located on the top or bottom surface of a photonic device and is configured to couple light from an independent light source located above or below the photonic device to the waveguide 12. The independent light source can, for example, be part of the packaging equipment.

The light coupled by the grating coupler 11 to the waveguide 12 is directed to an edge coupler 13 by the optical waveguide 12. Light from the edge coupler can then be viewed using any suitable light sensor, e.g. such as a camera. Preferably, an infrared (IR) imaging camera is used as wavelengths in the range of 1300-1550 nm are preferred.

Thus, by coupling the other end of an edge coupled waveguide 12 to a grating coupler 11 it becomes possible to illuminate the waveguide 12 using an external light source. This enables precise viewing and positioning of edge coupler 13 to facilitate accurate alignment and packaging of the external optical components. For the sake of brevity, an edge coupled waveguide which is also provided with a grating coupler can be referred to as a marker waveguide.

In a preferred embodiment the invention makes use of two surface coupling structures or grating couplers to couple light into optical waveguide to enable packaging of optical components, such as fibers and micro lenses. The invention can make use of any surface feature that will scatter light into the waveguide when illuminated from the top or bottom of the photonic device. Packaging requires very low levels of coupled light so the packaging camera can 'see' the waveguides to start the alignment process, which can be termed 'first-light'. In the present application the use of gratings which diffract light into the waveguide can be replaced by surface micro mirrors or an etched cavity of the like. It was found structures may be more suited than gratings for photonic devices using InP or SiN materials, as grating are difficult to implement in these semiconductor materials.

Furthermore, the present invention makes use of one or more 'alignment wave guides' which are optical waveguides located outside a set of waveguides, with the functional or usable waveguides positioned in-between these two outer alignment waveguides. This configuration enables not only lateral (x and y) alignment, but also angular alignment, which is essential for precise packaging of optical components such as fiber arrays or micro lens arrays.

Figure 3:
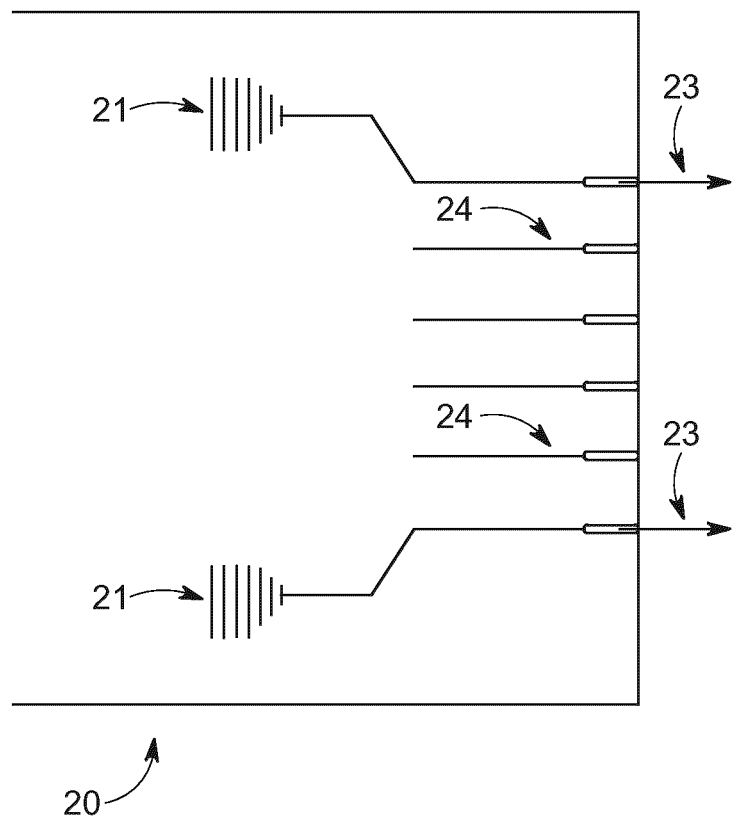
FIG. 3 is a top view of a PIC comprising two alignment elements.

FIG. 3 shows an example of a PIC 20 using the optical element 10 shown in FIG. 2. As illustrated in FIG. 3, when packaging an array of functional optical edge coupled waveguides 24 elements, one or more of marker waveguides 21 can be provided in addition to the array. Preferably at least two marker waveguides 21 are provided to ensure correct alignment. More preferably, the at least two marker waveguides 21 are provided such that at least one marker waveguide 21 is located at each outer position of the waveguide array 24 as shown in FIG. 3.

These marker waveguides 24 have a fixed pitch. Preferably this fixed pitch has the same value as the other (functional) waveguides in the photonic device. These marker waveguides are used to precisely locate the positions of all the waveguides. This is possible because all the waveguides can be accurately pitched (i.e. spaced and/or angled) with respect to each other as they are defined using a sub-micron photolithographic process. In this arrangement, the elements enable a method of illumination and active alignment of arrays of external optical components.

In situations where the photonic device can be mounted up-side-down or flipchip packaged. This will require coupling to the alignment waveguides through the device backside substrate, and a clear optical path must be made through the substrate in order for the light to reach the scattering structure and couple into the alignment waveguides.

Figure 4:
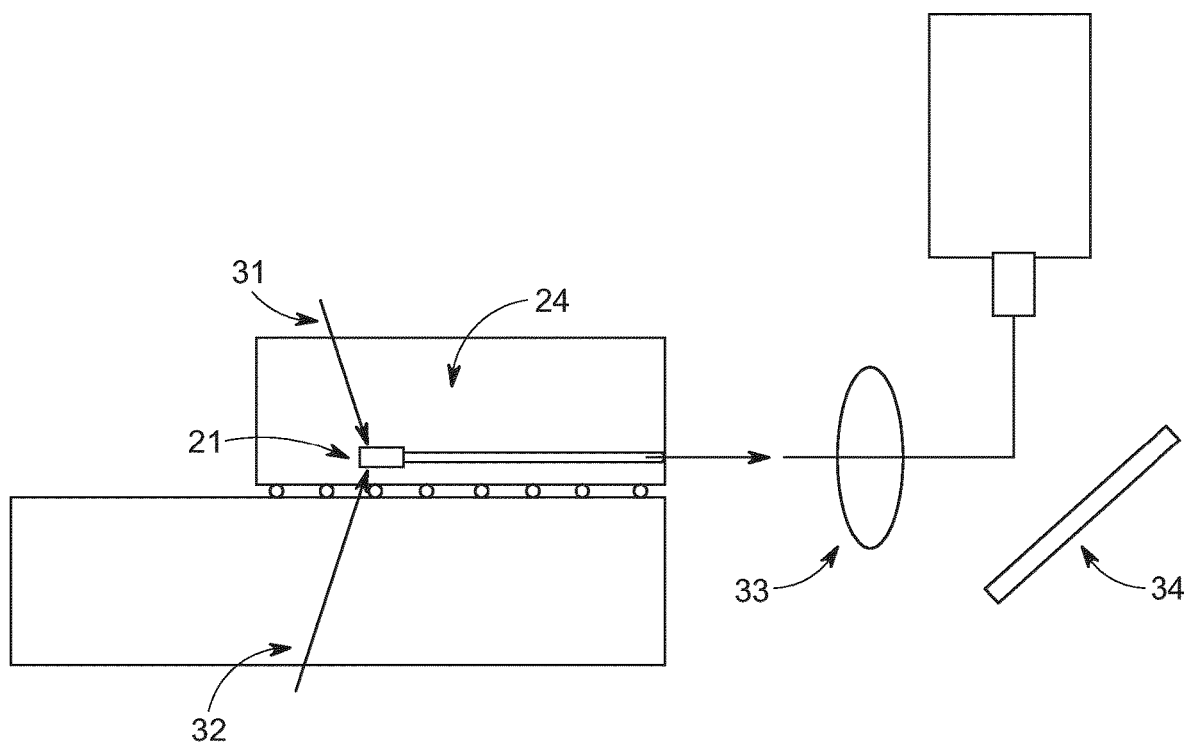
FIG. 4 is a side view of a PIC being aligned on an Electrical Interposer.

With reference to FIG. 4, the grating coupler 21 for these marker waveguides 24 can be illuminated from the top 31 or bottom 32 of the photonic device—the latter configuration enables light to be transmitted through the device substrate to illuminate the grating. It should be noted that illumination through the substrate enables active alignment when the photonic device is flipchip mounted up-side-down on an electrical interposer. For silicon photonics, operating wavelengths are typically 1300 nm or above, which is within the optical transparency band of the silicon substrate.

FIG. 4 shows one embodiment of a design of PIC in accordance with the present disclosure. The PIC is flipchip mounted on a silicon or glass interposer substrate. The grating coupler 21 for the marker waveguides 24 can be illuminated from the top though the device substrate, or from the bottom through the silicon or glass interposer substrate. The light source used to illuminate the grating coupler can be part of the packaging equipment and separate from the photonic device. A micro lens array 33 is used to achieve beam expansion and collimation. The micro lens alignment equipment includes a turning mirror or periscope 34 and an imaging system 35. This enables real-time accurate active alignment of the micro lens 33 to the array of optical waveguides in the PIC.

Figure 5:
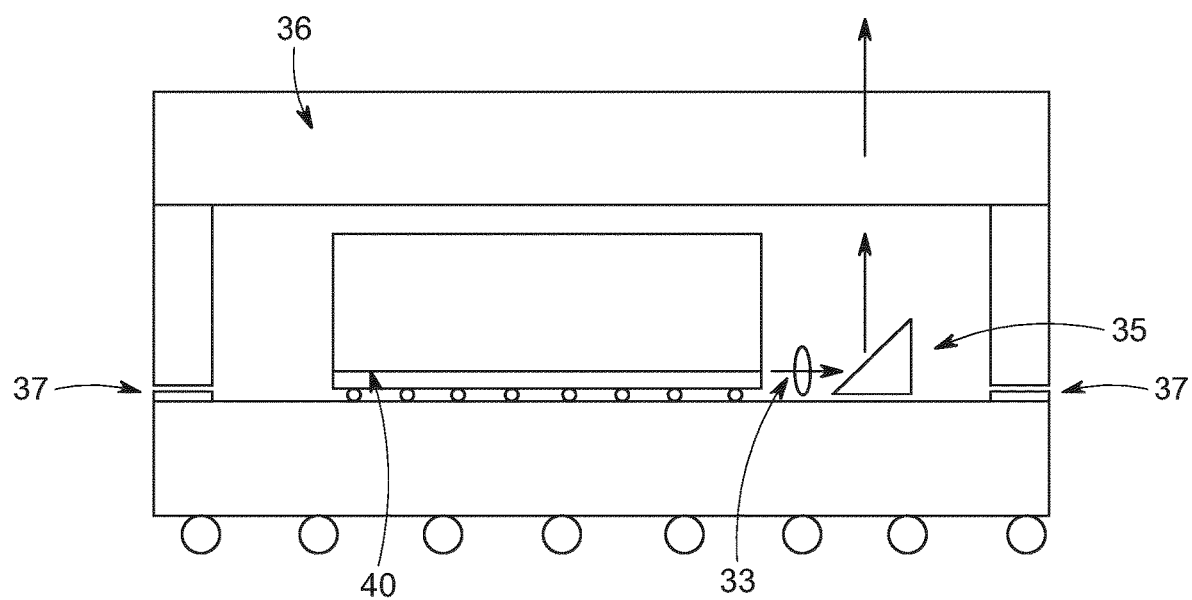
FIG. 5 is a side cut-away view of an aligned and packaged PIC.

FIG. 5 shows a micro lens array 33 being actively aligned to the edge of the flipchip mounted PIC 40. The micro lens array is used to achieve beam expansion and collimation. In this embodiment, the package includes micro prism 35 located after the micro lens array. This micro prism 35 is used to turn the direction of the edge emitted light, directing the light upwards and out of the photonic package. In this embodiment, the photonic package can incorporate a silicon or glass capping layer 36, enabling transmission of the emitted from the capped or sealed package, where the package can be hermetic sealed at wafer-level using e.g. a solder seal 37 between the package base and cap 36.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A device comprising a photonic integrated circuit (PIC) and a glass or silicon interposer on which the PIC is flipchip mounted, said PIC comprising a marker waveguide, wherein the marker waveguide comprises:
   a first end located at the edge of the PIC wherein the first end is coupled to an edge coupling; and
   a second end coupled to a grating coupler or device coupler, wherein:
   the grating coupler or a device coupler is configured to receive light through the glass or silicon interposer and further through a substrate of the PIC from above the PIC, and couple the light to the waveguide to illuminate the waveguide to facilitate the correct alignment of the edge coupler to an external component.

2. The device of claim 1, wherein the PIC comprises two or more marker waveguides and an array of other edge coupled waveguides.

3. The device of claim 2, wherein at least two marker waveguides are provided, one at each outer position of the waveguide array.

4. The device of claim 2, wherein the marker waveguides are positioned at a fixed pitch.

5. The device of claim 2, wherein the marker waveguides are positioned at a fixed pitch and the fixed pitch matches the pitch of the other edge coupled waveguides.

6. The device of claim 1, further comprising an integrated micro turning mirror and silicon or glass package capping layer, through which input and output light can be transmitted.

7. The device of claim 1, further comprising one or more micro lenses, wherein the one or more micro lenses are actively aligned to the edge of photonic device using packaging equipment including a tuning mirror or periscope and imaging camera.

8. A method of aligning a photonic integrated circuit (PIC) with an external optical element comprising:
   flipchip mounting the PIC on a glass or silicon interposer;
   providing the PIC with a marker waveguide, wherein a marker waveguide is a waveguide having:
   a first end located at the edge of the PIC, wherein the first end is coupled to an edge coupling; and
   a second end coupled to a grating coupler or a device coupler, wherein:
   the grating coupler or device coupler is configured to receive light through the glass or silicon interposer and further through a substrate of the PIC from above the PIC, and couple the light to the waveguide to illuminate the waveguide to facilitate the correct alignment of the edge coupler to an external component;
   illuminating the grating coupler or device coupler of the marker waveguide with a light source to illuminate the marker waveguide; and
   aligning the PIC using the light emitted by the edge coupler of the marker waveguide.

9. The method of claim 8, wherein the PIC is provided with two marker waveguides.

10. The method of claim 8, wherein the light illuminating the grating coupler of the marker waveguide is directed to the grating coupler of the marker waveguide from:
    above the PIC surface; or
    below the PIC surface, through the substrate of a device comprising the PIC.

11. The method of claim 8, wherein the light source is comprised within the packaging equipment for packaging the PIC to facilitate the active alignment of the PIC.

12. The method of claim 8, wherein:
    the PIC is provided with at least two marker waveguides; and
    the marker waveguides are provided at each outer position of an
    array of other edge coupled waveguides.

13. The method of claim 8, wherein the marker waveguides are positioned as outer waveguides with a fixed pitch, wherein the fixed pitch matches the pitch of the other waveguides in an array of waveguides.

14. The method of claim 8, wherein micro lenses are actively aligned to the edge of photonic device using packaging equipment including a tuning mirror or periscope and imaging camera.

* * * * *